(12) United States Patent
Pirutin

(10) Patent No.: US 10,550,946 B2
(45) Date of Patent: Feb. 4, 2020

(54) MIXER WATER FAUCET

(71) Applicant: Hamat Sanitary Fittings and Casting Ltd., Ashdod (IL)

(72) Inventor: Shlomo Pirutin, Ashdod (IL)

(73) Assignee: HAMAT SANITARY FITTINGS AND CASTING LTD., Ashdod (IL)

( * ) Notice: Subject to any disclaimer, the term of this patent is extended or adjusted under 35 U.S.C. 154(b) by 0 days.

(21) Appl. No.: 16/247,607

(22) Filed: Jan. 15, 2019

(65) Prior Publication Data

US 2019/0145533 A1   May 16, 2019

Related U.S. Application Data

(63) Continuation-in-part of application No. 15/477,091, filed on Apr. 2, 2017, now Pat. No. 10,209,722.

(60) Provisional application No. 62/317,645, filed on Apr. 4, 2016.

(51) Int. Cl.
*F16K 11/087* (2006.01)
*E03C 1/04* (2006.01)

(52) U.S. Cl.
CPC .......... *F16K 11/087* (2013.01); *E03C 1/0402* (2013.01); *Y10T 137/9464* (2015.04)

(58) Field of Classification Search
USPC ......................................................... 137/801
See application file for complete search history.

(56) References Cited

U.S. PATENT DOCUMENTS

| | | | | |
|---|---|---|---|---|
| 6,219,860 B1 ‡ | 4/2001 | Chang | ................... | E03C 1/0404 137/801 |
| 7,162,782 B1 ‡ | 1/2007 | Nelson | ................... | E03C 1/0404 29/225 |
| 7,313,834 B2 ‡ | 1/2008 | Tan | ........................ | E03C 1/0404 137/801 |

FOREIGN PATENT DOCUMENTS

| | | | |
|---|---|---|---|
| DE | 3434735 | ‡ | 4/1986 |
| DE | 102014001606 | ‡ | 8/2015 |
| WO | WO-2009/076981 | ‡ | 6/2009 |

‡ imported from a related application

*Primary Examiner* — Jessica Cahill
*Assistant Examiner* — Daphne M Barry
(74) *Attorney, Agent, or Firm* — JMB Davis Ben-David

(57) ABSTRACT

A mixer water faucet for installation through a bore in a work surface in proximity to a water supply, includes a stationary housing extending transversely through the bore; a faucet body mounted onto the housing, rotatable relative thereto; a main and auxiliary spouts extending from the housing; main and auxiliary supply hoses extending through the housing for conveying water to the main and auxiliary spouts, respectively; and a diverter for selectably directing a supply of water to the main and auxiliary spouts, wherein the main spout rotates about a rotation axis extending through the faucet body, the rotation causing a lateral movement and partial twisting of the auxiliary water supply hose with respect to the main water supply hose thereby to allow thereby to allow freedom of movement of the auxiliary spout and the auxiliary hose during extension and retraction thereof.

6 Claims, 4 Drawing Sheets

MIXER WATER FAUCET

CROSS REFERENCE TO RELATED APPLICATIONS

This is a continuation-in-part of U.S. patent application Ser. No. 15/477,091 filed Apr. 2, 2017, which claims the benefit of U.S. Provisional Patent Application No. 62/317,645 filed Apr. 4, 2016. The contents of the foregoing patent applications are incorporated by reference herein in their entirety.

FIELD OF THE INVENTION

The present invention relates to the field of water faucets and water taps.

BACKGROUND

A water faucet or water tap is a device able to control the flow of water. A water faucet may allow a user to commence and to stop the flow of water from a plumbing system or from a water-delivery system. A water faucet may further allow a user to modify the pressure of water flow, or the volume of water that flows per time unit.

Some water faucets may be implemented as a "mixer tap", for example, featuring a single handle enabling the user to mix hot water supply with cold water supply, to achieve a desired temperature.

Also known are mixer faucets having a nozzle incorporating a spray function in the spout are also known, the nozzle often being attached by a hose which is long enough to permit it to be pulled out.

The size of the hole or bore required to accommodate a mixer faucet is usually about 35 mm, while the outside dimensions of the faucet body are typically 35-50 mm. While the sizes of hose used depends on the desired water flow exiting the faucet, its external diameter will normally be no less than 8 mm.

SUMMARY OF THE INVENTION

In accordance with an embodiment of the invention, there is provided a mixer water faucet for installation through a bore in a work surface in proximity to a water supply, which includes:

a stationary housing extending transversely through the bore;

a faucet body mounted onto the housing, rotatable relative thereto;

a main spout and an auxiliary spout extending from the housing;

a main water supply hose for conveying water to the main spout and an auxiliary water supply hose for conveying water to the auxiliary spout, the main water supply hose and the auxiliary water supply hose extending through the housing; and a diverter for selectably directing a supply of water to the main spout and the auxiliary spout, wherein the main spout rotates about a rotation axis extending through the faucet body, the rotation causing a lateral movement and partial twisting of the auxiliary water supply hose with respect to the main water supply hose thereby to allow thereby to allow freedom of movement of the auxiliary spout and the auxiliary hose during extension and retraction thereof.

Additionally in accordance with an embodiment of the invention, the auxiliary spout is removably mounted onto a rear portion of the faucet body for use at a location relatively remote from the main spout, and the auxiliary water supply hose is adapted for extension through the housing when the auxiliary spout is removed from the faucet body, and for retraction through the housing when re-mounted onto the faucet body.

Further in accordance with an embodiment of the invention, the auxiliary spout is a pull-up water spraying element which is located and mounted behind the faucet body and is held or mounted generally-vertically therebehind; and the pull-up water spraying element is releasable from the faucet body by being pulled in an upward direction.

Additionally in accordance with an embodiment of the invention, the stationary housing has a base having a base opening formed therein and an upper portion having formed therein a main opening aligned with the base opening, and further having an auxiliary opening communicating with the base opening aligned along an auxiliary axis, eccentric from a main axis, the main water supply hose enters the housing through the base opening, and exits the housing though the main opening, and the auxiliary water supply hose enters the housing through the base opening adjacent to the main water supply hose, and exits the housing through the auxiliary opening, the alignment of the auxiliary water supply hose translating from a first auxiliary axis on entry into the base opening to a second auxiliary axis on exit from the auxiliary opening, wherein the first and second auxiliary axes are eccentric with respect to the rotation axis.

Further in accordance with an embodiment of the invention, the base opening is formed to allow the lateral movement and partial twisting of the auxiliary water supply hose with respect to the main water supply hose with respect to each other.

Additionally in accordance with an embodiment of the invention, the main water supply hose is aligned along the main axis which is eccentric with respect to the rotation axis.

GENERAL DESCRIPTION OF THE INVENTION

The term "faucet" or "water faucet" as used herein may include, for example, any suitable faucet or tap or valve that controls the flow of water or other liquids; including, but not limited to, a water faucet intended for installation and utilization in a home, a household, a dwelling, an office, a business venue, a factory, a kitchen, a bathroom, a restroom, indoors, outdoors, and/or other suitable places or venues; such faucet having or utilizing or being controlled by a single handle, or two handles, or a knob, or two knobs, or by other user interface elements or controlling elements; and including, but not limited to, a pull-out faucet, a pull-down faucet, a single-handle faucet, a double-handle faucet, a bar faucet, a wall mount faucet, a pot filler faucet, a touch-less faucet or hands-free faucet (e.g., activated by sensing a motion of a hand or a gesture of the user), and/or other suitable types of faucets or taps.

Applicants have realized that in conventional systems, a main water faucet is sometimes accompanied by a separate side-spray or side-spray element, which is separate and independent from the main water faucet. Applicants have realized that this configuration may suffer from one or more problems or disadvantages, for example: (a) the need to drill two separate holes in a surface or platform (e.g., granite, marble, artificial marble, or other kitchen platform or surface); (b) increased form-factor, and reduced utilization of the kitchen platform due to the fact that two separate units occupy space, side-by-side or next to each other; (c) the need to maintain, clean and/or repair two separate units; (d) reduced convenience for some users, who need to reach sideways to grasp the side-spray unit, while the user is standing in proximity to (or in front of) the main water faucet.

Applicants have realized that it may be beneficial or advantageous to provide an integral or integrated device, which comprises in the same integrated unit, referred to as water faucet 10 below: (i) a main water faucet, referred to hereinbelow as main spout 20, including a single handle that controls the flow of both cold water and hot water; (ii) a spraying unit or a spout unit or spout, referred to hereinbelow as auxiliary spout 26, which is located and/or stored and/or mounted generally behind the main water faucet (e.g., immediately adjacent to the main water faucet; or immediately on its right side or its left side, immediately adjacent to the main water faucet), and utilizes the same single-hole drilled in the kitchen platform (e.g., granite, marble, artificial marble); and (iii) a diverter unit, responsive to manual actuation or manual selection of the user via a diverter switch or diverter lever or diverter button or diverter slider or other diversion interface, to divert or to direct the flow of water, in a selective manner, to either the main water faucet or the spraying unit, and vice versa.

In some embodiments, the combined faucet 10 receives incoming water from a cold water pipe (or tube), referred to as below as cold water hose 32, and from a hot water pipe (or tube), referred to below as hot water hose 30; and the diverter mechanism or diverter unit, based on the manual position or actuation thereof, diverts or directs the mixed water (or the single stream of water) to either the spraying unit 26 or the main faucet 20.

In some embodiments, the spraying or auxiliary 26 is connected to an elongated and flexible pipe or tube, which allows the user to pull-out or to pull-up the spraying unit 26, and to distance it from the water faucet or main spout 20, in order to reach locations or areas that the main water faucet 20 (which lets the water flow downwardly and generally vertically) cannot reach; and which also enables the user to utilize the spraying unit 26 for a variety of tasks, for example, cleaning the sink or the sink area or the platform next to the faucet, filling-up water into a coffee-maker machine or a soda-maker machine or into a pot or a pan or a cooking appliance, or the like.

Optionally, the auxiliary spout or spraying-unit 26 may have an actuation button 24, such that only when the user presses the button does water flow out of the auxiliary spout or spraying-unit 26; and such that water does not flow out of the spout or spraying-unit once the button is depressed or un-pressed or is not touched (or not pressed) any more by the user. Optionally, the spout or spraying-unit may comprise one or more buttons or user-interface elements (e.g., a lever, a slider, a rotating selector, or the like), which may switch or modify the operational characteristics of the spout or the spraying unit; for example, between a regular flow, a "spray" type flow or scattered-flow, an "aerated" flow, a "pause"/"un-pause" button. In some embodiments, the auxiliary spout 26 may have a button to trigger or to cause diversion of the water flow, from flowing exclusively through the main faucet 20, to be diverted into and to flow outwardly exclusively through the spouting unit or spraying unit. For example, if the lever or handle of the main faucet is pulled or moved by a user to enable flow of water, then as a "default route", the water flows out through the main faucet and not to the spraying unit; and only if or when the user presses the actuation button in the spraying unit, the diversion mechanism is triggered to operate and the flow of water is diverted to flow out through the pulled-out spraying unit, instead of through the main faucet.

In some embodiments, the main water faucet may comprise, on its rear side 28 (e.g., the side that is located away from the user, or is located between the faucet and a wall that typically exists behind the faucet, a particular cavity or channel or crater or rib, that enables the secure placement or mounting or holding-in-place of the spout unit or spraying unit, when not in use or after its utilization is over. In some embodiments, the pulled-out flexible pipe or flexible tube of the spout or spraying-unit, may be inserted back downwardly and may be stored within or under the kitchen platform or under the sink, hidden away from the user when not in use.

In some embodiments, the water-outlet of the auxiliary spout 26, when the spout is mounted or held-in-place behind the main faucet 20, may face backwardly or rearward, away from the user, or towards a back-wall that may be located behind the water faucet. In other embodiments, the water-outlet of the auxiliary spout 26, when mounted or held-in-place behind the main faucet 20, may face the front, towards the user, or towards the rear-side of the main faucet 20 which "hides" or blocks that water outlet from the user.

In some embodiments, the pull-up auxiliary spout or spraying unit 26 of the present invention, is not merely a pull-out unit that is pulled out (or away) from the main faucet 20, in a downward direction or in a horizontal direction in order to be released from the grip of (or from the holding by) the main water faucet. Rather, the pull-up auxiliary spout or spraying unit 26 of the present invention is a pull-up unit that can be pulled up, or upwardly, or only upwardly, or exclusively upwardly, in order to be released from the grip of (or from the holding by) the main faucet 20; and only after such upward-only pull-up for the safe release of the spout from the rear-side of the water faucet that holds it, only then may the auxiliary spout unit 26 be moved around the area flexibly while being connected to the water system via the flexible pipe or flexible tube thereof.

In some embodiments, optionally, the entirety of the auxiliary spout or spraying-unit 26 may be a generally flat unit, or a rectangular unit, or a box or cuboid or rectangular cuboid unit; and may not comprise any L-shaped ending or edge or protrusion or spout-area; thereby keeping the form-factor of the unit small, and/or thereby allowing smoother holding by the user which may hold the unit similar to holding a flat handle and without an L-shaped ending or protrusion, and/or thereby enabling the auxiliary spout or spraying-unit 26 to spray water in an un-obstructed manner from a flat or generally-flat water outlet of the auxiliary spout 26 and without being restricted or obstructed by a protrusion or an L-shaped ending of the spout. In other embodiments, the spraying unit or the auxiliary spout element 26 may be generally flat but may also have a slightly protruding water-outlet at or near its distal end (e.g., away from the base of the faucet), through which the water flows out or is sprayed out or is spouted out.

In some embodiments, the auxiliary spout element or the spraying element 26 may be structured to exactly complement a generally-vertical crater or insert or crater than is indented into the rear-side of the main water faucet 20; such that the integrated device 10, namely the main water faucet 20 in the front and the held-in-place auxiliary spout unit 26 in the back, together form a perfect or generally-perfect cylinder or rectangular cuboid or other shape which is generally straight and lacks protrusions or craters.

In some embodiments, the water faucet system 10 of the present invention and/or its units or elements, may be utilized in (or may be implemented as): a pull-up water faucet system, a single-state or dual-state pull-out water faucet system, and/or other suitable types of water faucet systems.

In some embodiments, optionally, a user may permanently or temporarily remove or cancel the operation of the auxiliary spraying unit 26; for example, by adding or inserting or appending or inserting a suitable seal or blocking-element or cover or water-blocker or similar element, at or near the externally-facing water-outlet of the spraying unit and/or at the base-area of the spraying unit and/or within the spraying unit and/or at (or near) the connection between the spraying unit and the main water faucet and/or at (or near) the diverting mechanism that diverts water from the main water faucet to the pull-up spraying unit. In some embodiments, optionally, the entire pull-up spraying unit may be removed from the water faucet system (e.g., permanently or temporarily); and/or may be replaced in a modular manner with other suitable water-outlet units, for example, thereby converting the water faucet system into a fixed-outlet system or a non-moving-outlet system, or thereby converting the water faucet system into a pull-out system, or the like.

Functions, operations, components and/or features described herein with reference to one or more embodiments, may be combined with, or may be utilized in combination with, one or more other functions, operations, components and/or features described herein with reference to one or more other embodiments, or vice versa.

BRIEF DESCRIPTION OF THE DRAWINGS

The present invention will be more fully understood and appreciated from the following detailed description, taken in conjunction with the drawings, in which.

DETAILED DESCRIPTION

Figure 1A:
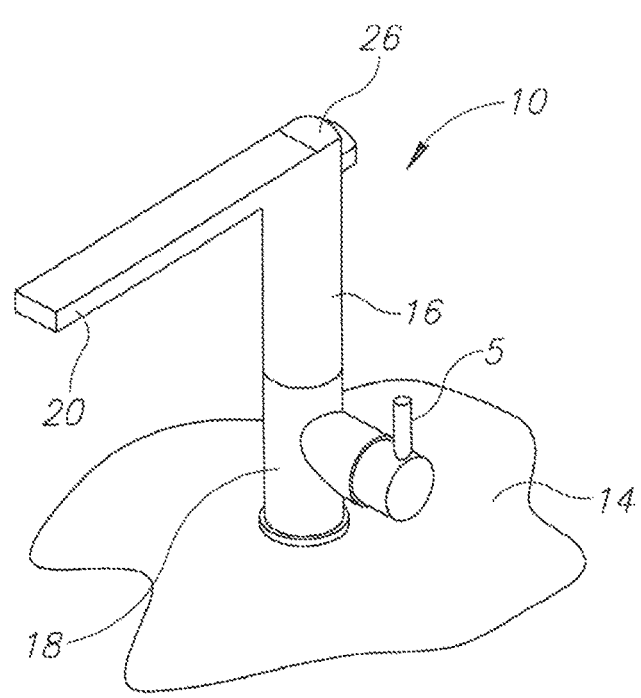
FIG. 1A is a pictorial representation of a water faucet constructed in accordance with an embodiment the present invention, as viewed from above a work surface in which the faucet is installed, wherein the auxiliary spout is in a retracted position.
Figure 2:
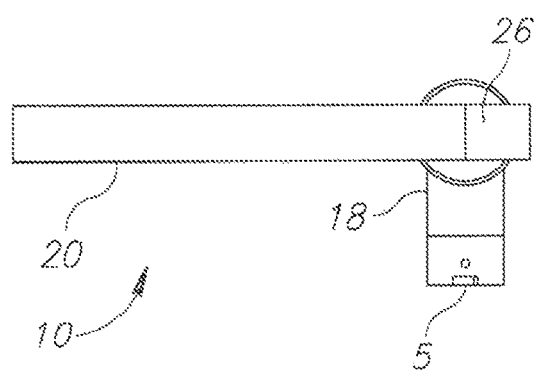
FIG. 2 is a plan view of the faucet of FIG. 1.
Figure 1B:
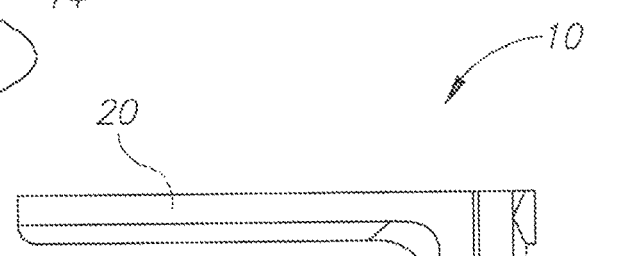
FIG. 1B is similar to FIG. 1A, but wherein the auxiliary spout is in an extended position.
Figure 1B:
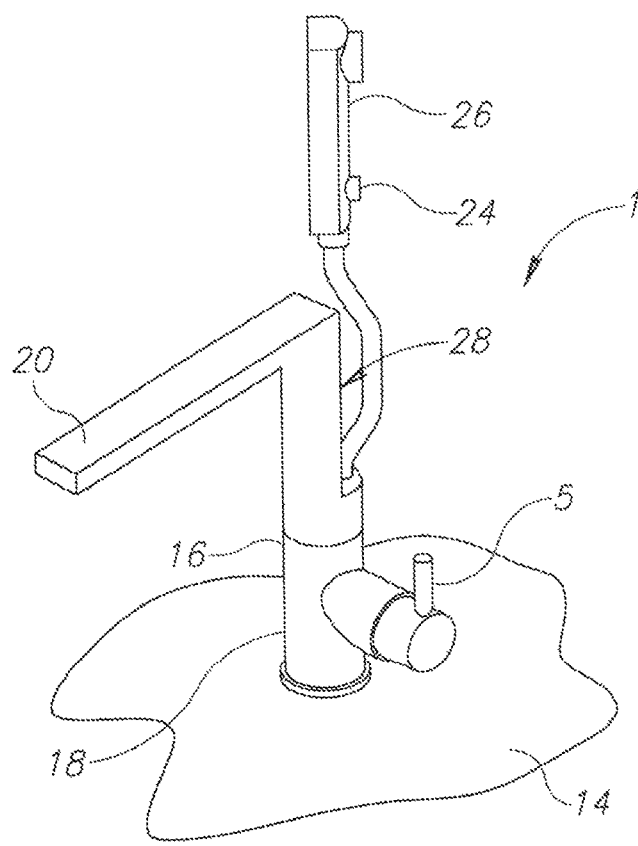
Figure 3:
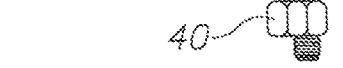
FIG. 3 is a partial side view of the faucet of FIG. 1.

Referring now to FIGS. 1-3, there is seen a water faucet, referenced generally 10, generally as described above, installed in a single hole 12, formed in a work surface or platform 14. Typically, but way of non-limiting example only, hole 12 has a diameter which is typically 35 mm as known in the art. Faucet 10 includes a faucet body 16 which may have an outside diameter of 35-50 mm as known in the art, and is supported on platform 14 via a housing 18 and shank 29. Body 16 is rotatable relative to housing 18 which has a fixed position relative to platform 14, and both are held in position via a suitable system of fasteners as illustrated and as generally known in the art. Faucet body 16 has a main spout 20 to which water is supplied as shown and described herein, inter alia, in conjunction with FIG. 4, by suitable operation of selector handle 5 and mode selector switch 24, mounted onto auxiliary spout 26. Operation of handle 5 and mode selector switch are generally as known in the art and are thus not described herein in detail, Auxiliary spout 26 is extendably mounted onto a rearward facing portion 28 (FIG. 1B) of faucet body 16. As described above, mode selector switch 24 may be any suitable switch, lever, button or slider to operate diverter 40 (seen in FIGS. 3 and 4), also as known in the art.

Figure 4:
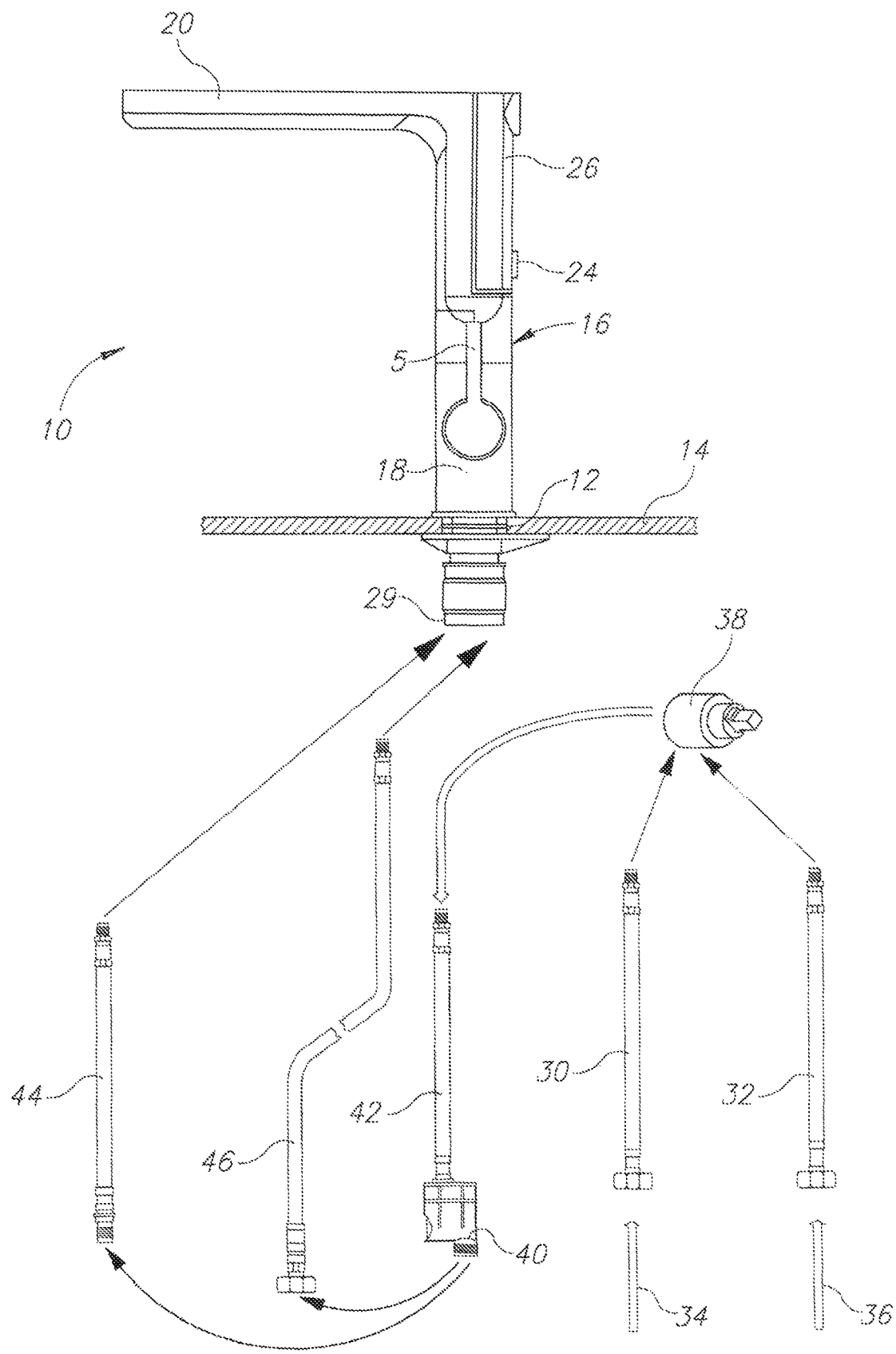
FIG. 4 is an exploded, schematic diagram showing the flow and distribution of water supplied to the faucet of FIG. 1.
Figures 5, 6:
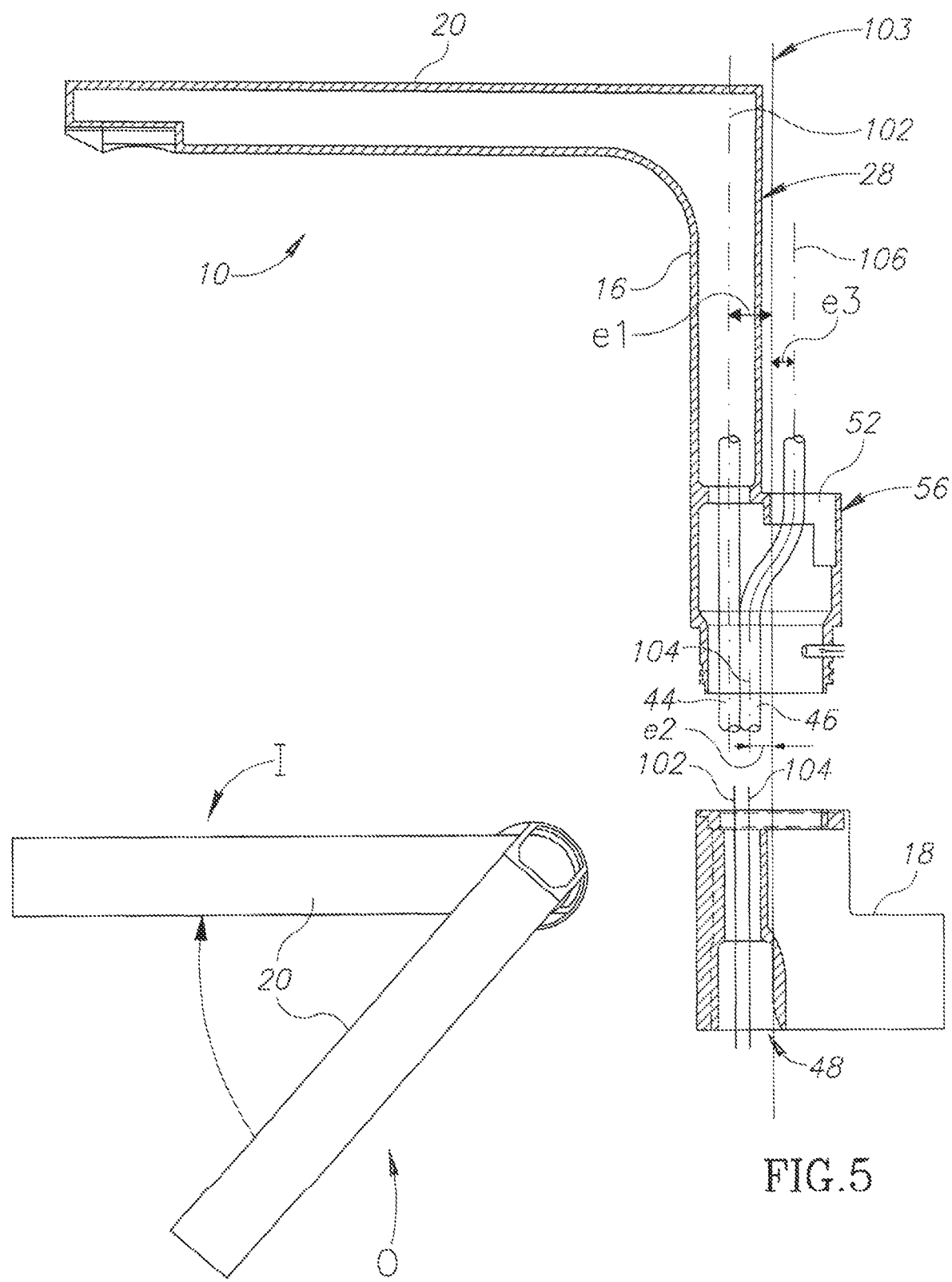
FIG. 5 is a side-sectional, partially exploded view of a faucet body 16 and main spout 20 constructed in accordance with an embodiment of the invention.
FIG. 6 is a schematic plan view of main spout when rotated from a first position to a second position.

Referring now also to FIGS. 4, 5, 6, 7A and 7B, the incorporation of main spout 20 and auxiliary spout 26 into a single, integrated faucet, requires a novel, bundled water flow circuitry into a single cluster of five hoses within shank 29 (FIG. 4) as described below in more detail in conjunction with FIG. 5.

As seen in the exploded view of FIG. 4, a pair of hot and cold water hoses, respectively referenced 30 and 32, are connected to hot and cold water supplies, respectively referenced 34 and 36. A water mixer cartridge 38 (FIG. 4), as known in the art, is located within housing 18 in operative association with selector handle 5. Hot and cold water is supplied to cartridge 38 via hot and cold water hoses 30 and 32, and a mixed water supply is delivered from cartridge 38 to external diverter 40, via intermediate hose 42. Water reaching diverter 40 may then be supplied either to main spout 20 or to auxiliary spout 26, via main spout hose 44 or auxiliary spout hose 46, respectively, depending on the operation of the mode selector switch 24.

Figure 7A:
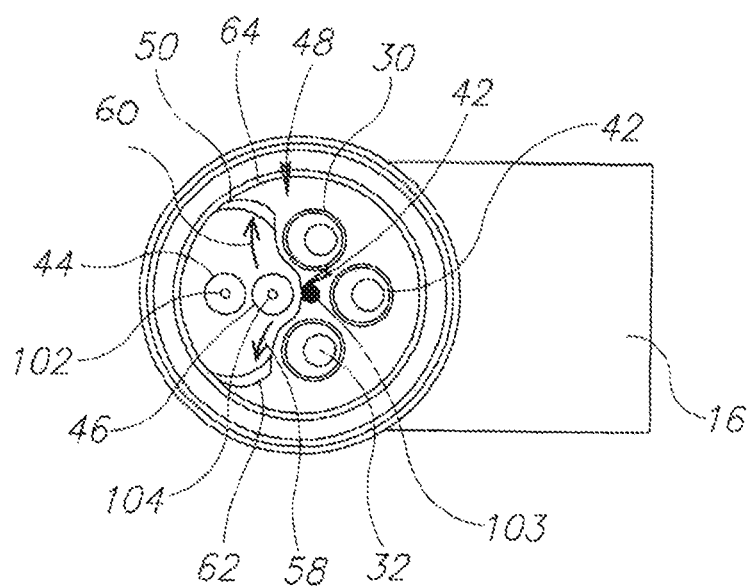
FIG. 7A is a bottom view of the faucet body of the invention, showing a base opening for the hoses through which water is provided to the main spout and the auxiliary spout, the eccentric positioning of both the main spout supply hose and the auxiliary spout supply hose relative to the axis of rotation of the main faucet body, and their movement consequent to the rotation of the main spout as shown in FIG. 6.

Referring now particularly to FIG. 7A, the respective positions of the five hoses are shown, wherein hot water hose 30, cold water hose 32 and intermediate hose 42 are seen to extend through suitable openings formed in the base 48 of housing 18. Main spout hose 44 and auxiliary spout hose 46 extend up into main body 16 through the housing 18, as described below.

A well-known problem of extendable hoses of spray faucets is that the extendable hose, which is required to move freely through the main faucet body, frequently becomes stuck, even though it is the only hose which extends through the faucet housing. For this reason, it is known to make use of a counterweight to assist in pulling the hose back through the main body of the faucet when seeking to retract the spray head.

Due to the desire to limit the overall external diameter of the faucet housing to those generally accepted within the field, typically, 35-50 mm, as well as the requirement to provide a flow of water by both the main spout and the auxiliary spout, thus, in the present example, limiting the minimum external diameter of their associated hoses to no less than 8 mm, a base opening, such as the illustrated shaped opening 50, is formed in base 48 to accommodate the two hoses. It will be appreciated that main spout hose 44 is static and auxiliary spout hose 46 is arranged for extension and retraction.

The main spout hose 44 is positioned along a main axis 102, which is parallel to but spaced from the axis of rotation 103 of the main body 16 and main faucet 20, by a distance or eccentricity denoted as 'e1' (FIG. 5). Furthermore, the auxiliary spout hose 46, extends through housing 18 along a first auxiliary axis 104 which is parallel to but spaced from the rotation axis 103 by a distance or eccentricity denoted as 'e2'.

As seen in FIG. 5, the auxiliary spout hose 46 extends through an auxiliary opening 52 formed in an upward facing base portion 56 connecting faucet body 16 to housing 18, thereafter to connect to the auxiliary spout 26. Auxiliary opening 52 defines a second auxiliary axis 106 along which the auxiliary spout hose 46 connects to the auxiliary spout 26. Second auxiliary axis 106 is parallel to but spaced from the axis of rotation 103 by a distance or eccentricity denoted as 'e3'.

In order to facilitate extension of the auxiliary spout 26, auxiliary spout hose 46 is provided with an additional length of hose which is adapted to hang down beneath the faucet and work surface 14 when auxiliary spout 26 is in an at rest, retracted position. When auxiliary spout 26 is extended from the main body 16, as seen in FIG. 1B, all or some of the additional length of hose is pulled through base opening 50 and auxiliary opening 52, as required.

Figure 7B:
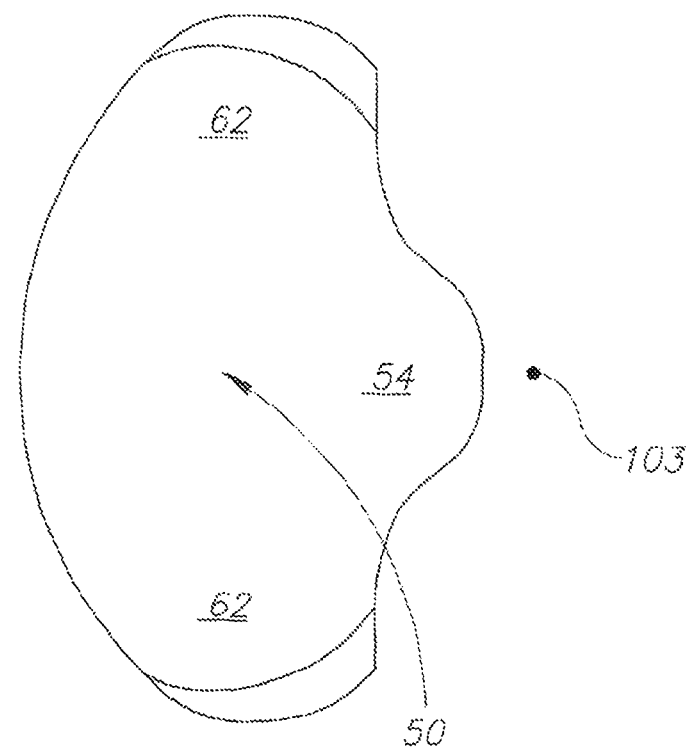
FIG. 7B is an enlarged view of the base opening and its position relative to the axis of rotation of the main faucet body.

When main spout 20 is at an initial "zero" position relative to the faucet body 16, as illustrated in FIG. 2 and as shown schematically as position "0" in FIG. 6, auxiliary spout hose 46 is retracted substantially along axes 104 and 106, being accommodated, in the present example, by a U-shaped depression portion 54 (FIG. 7B) of base opening 50, seen in FIGS. 7A and 7B.

However, when main spout 20 is rotated to the position indicated as "I", for example, thus rotating faucet body 16 relative to housing 18, this has the effect of applying a rotational force to both main spout hose 44 and auxiliary spout hose 46, pulling them in a lateral movement to one side or another, as shown by arrows 58 and 60 in FIG. 7A, depending on the direction in which main spout 20 is rotated. The extent of the pulling on each of the hoses is a function of the eccentricities e1, e2 and e3, and of the angle of rotation of main spout 20. In the illustrated example, base opening 50 opening is thus formed with additional end depressions 62 and 64, to accommodate the relative twisting motion of auxiliary spout hose 46 relative to main spout hose 44, while still allowing sufficient freedom of lateral movement therebetween when auxiliary spout hose 46 is extended or retracted when extending or retracting auxiliary spout 26.

While certain features of some embodiments have been illustrated, and described herein, many modifications, substitutions, changes, and equivalents may occur to those skilled in the art. Accordingly, the claims are intended to cover all such modifications, substitutions, changes, and equivalents.

What is claimed is:

1. A mixer water faucet for installation through a bore in a work surface in proximity to a water supply, which includes:
    a) a stationary housing extending transversely through the bore;
    b) a faucet body mounted onto said housing, rotatable relative thereto;
    c) a main spout and an auxiliary spout extending from said housing;
    d) a main water supply hose for conveying water to said main spout and an auxiliary water supply hose for conveying water to said auxiliary spout, said main water supply hose and said auxiliary water supply hose extending through said housing;
    e) a diverter for selectably directing a supply of water to said main spout and said auxiliary spout, and
    wherein said main spout rotates about a rotation axis extending through said faucet body, said rotation causing a lateral movement and partial twisting of said auxiliary water supply hose with respect to said main water supply hose thereby to allow freedom of movement of said auxiliary spout and said auxiliary hose during extension and retraction thereof.

2. A mixer water faucet according to claim 1, wherein said auxiliary spout is removably mounted onto a rear portion of said faucet body for use at a location relatively remote from said main spout, and said auxiliary water supply hose is adapted for extension through said housing when said auxiliary spout is removed from said faucet body, and for retraction through said housing when re-mounted onto said faucet body.

3. A mixer water faucet according to claim 1, wherein
    said auxiliary spout is a pull-up water spraying element which is located and mounted behind said faucet body and is held or mounted generally-vertically therebehind; and
    said pull-up water spraying element is releasable from the faucet body by being pulled in an upward direction.

4. A water faucet according to claim 1, wherein
    said stationary housing has a base having a base opening formed therein and an upper portion having formed therein a main opening aligned with said base opening, and further having an auxiliary opening communicating with said base opening aligned along an auxiliary axis, eccentric from a main axis,
    said main water supply hose enters said housing through said base opening, and exits said housing though said main opening, and
    said auxiliary water supply hose enters said housing through said base opening adjacent to said main water supply hose, and exits said housing through said auxiliary opening, the alignment of said auxiliary water supply hose translating from a first auxiliary axis on entry into said base opening to a second auxiliary axis on exit from said auxiliary opening, wherein said first and second auxiliary axes are eccentric with respect to said rotation axis.

5. A mixer water faucet according to claim 4, wherein said base opening is formed to allow said lateral movement and partial twisting of said auxiliary water supply hose with respect to said main water supply hose with respect to each other.

6. A mixer water faucet according to claim 5, wherein said main water supply hose is aligned along said main axis which is eccentric with respect to said rotation axis.

\* \* \* \* \*